US005392811A

United States Patent [19]

Maley et al.

[11] Patent Number: 5,392,811

[45] Date of Patent: Feb. 28, 1995

[54] HIGH PRESSURE FUEL SYSTEM VALVE

[75] Inventors: Dale C. Maley, Fairbury; David M. Olson, Peoria Heights; Ronald D. Shinogle, Peoria, all of Ill.

[73] Assignee: Caterpillar Inc., Peoria, Ill.

[21] Appl. No.: 144,383

[22] Filed: Nov. 2, 1993

[51] Int. Cl.⁶ .............................................. F16K 15/00

[52] U.S. Cl. .................................... 137/514; 123/467; 137/534

[58] Field of Search ................ 123/467; 137/514, 532, 137/534; 251/64

[56] References Cited

U.S. PATENT DOCUMENTS

| | | | |
|---|---|---|---|
| 129,138 | 7/1872 | Jewell | 137/534 X |
| 455,913 | 7/1891 | Walker | 137/534 |
| 2,916,147 | 12/1959 | Checke | 137/534 X |
| 3,130,748 | 4/1964 | Weingartner | 137/514 |

*Primary Examiner*—Robert G. Nilson
*Attorney, Agent, or Firm*—Frank L. Hart

[57] ABSTRACT

A fuel system valve has a metal valve seat and a metal valve body. The metal valve body has a chamber which contains material which is moveable through the chamber in response to deceleration of the valve body. The forces of the material within the chamber on the valve body during rapid deceleration of the valve body counteract the forces subjected on the valve body in response to contact with the valve seat.

6 Claims, 2 Drawing Sheets

HIGH PRESSURE FUEL SYSTEM VALVE

TECHNICAL FIELD

The present invention relates to a high pressure fuel system valve.

BACKGROUND ART

In heretofore utilized fuel system valves, the rate of closing of the valve was not as critical in the past as is presently required of today's high pressure, fast acting fuel systems.

As the speed requirements of modern technology increased, a point was reached where the inertia of the valve body closing on the stationary valve seat caused the valve body, upon impact with the valve seat, to bounce backwards from the seat and momentarily generate a fluid passage between the valve seat and the valve body. This was increasingly undesirable since abrupt shutoff of fuel is most often desired in fuel systems.

In order to decrease the valve body bounce back, springs and other force generating devices where associated with the valve body to counteract this undesired valve body movement. These heretofore utilized devices increased the complexity of the valve body, were relatively ineffective and represented the waste of time, labor, materials and natural resources.

The present invention is directed to overcome one or more of the problems as set forth above.

DISCLOSURE OF THE INVENTION

In one aspect of the invention, a fuel system valve has a metal valve seat and a metal body. The valve body is moveable at relatively high rates of speed between a first open position at which the valve body is spaced from the valve seat and a second closed position at which the valve body is contacting the valve seat.

The valve has a chamber with the chamber having a volume "X" of preselected magnitude. A material having a volume "Y" less than the volume "X" of the valve body chamber is positioned within the valve body chamber and moveable within the chamber in response to deceleration of the valve body.

BEST MODE FOR CARRYING OUT THE INVENTION

Figure 1:
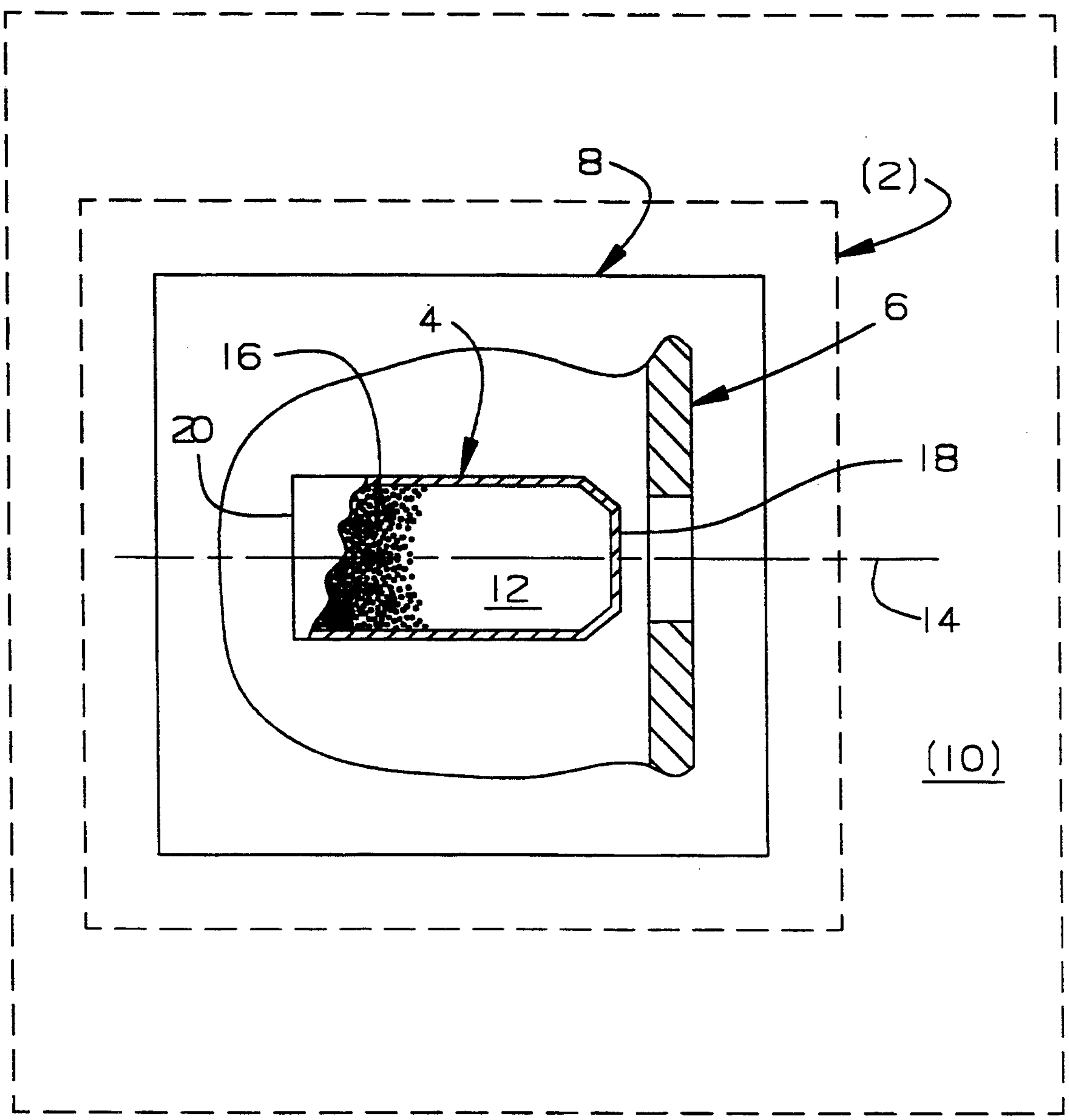
FIG. 1 shows a diesel engine having a fuel system with the valve of this invention in the open position and FIG. 2 shows the valve of FIG. 1 in the closed position.
Figure 2:
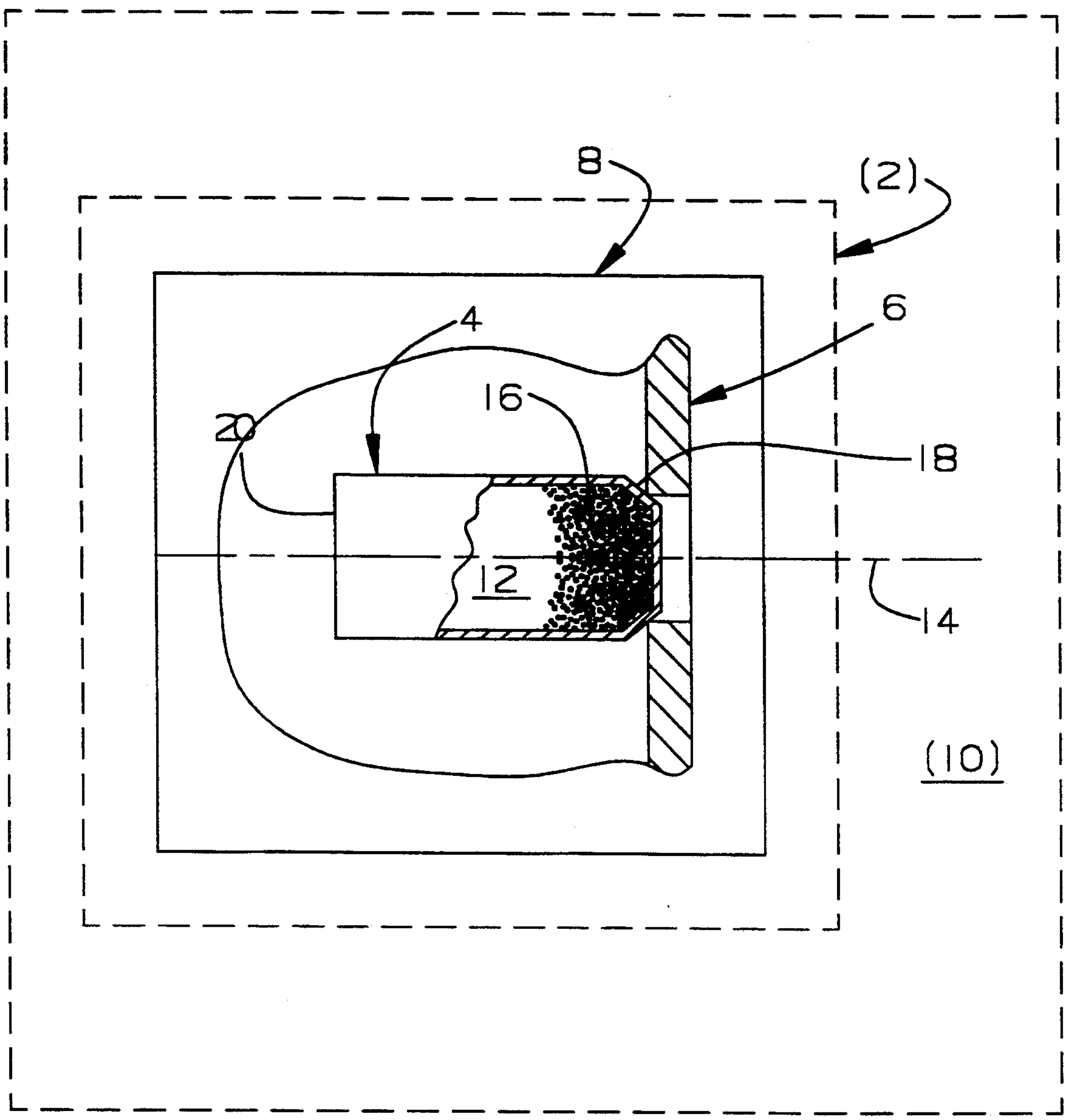

Referring to FIGS. 1 and 2, a fuel system valve 2 has a valve body 4, a valve seat 6, and a valve housing 8. The fuel system valve 2 is preferably associated with the fuel system of a diesel engine 10 commonly used in earth working machines and other machines utilized where a great deal of power is desirable. Since such diesel engines, fuel systems and the valves of those fuel systems are well known in the art, the drawings have been simplified and will be described in a manner to explicitly set forth the invention.

The valve body 4 and seat 6 are formed of metal and the valve body 4 is moveable at relatively high rates of speed between a first open position, shown in FIG. 1, at which the valve body 4 is spaced from the valve seat 6 and a second closed position, shown in FIG. 2, at which the valve body 4 is contacting the valve seat 6 and preventing fluid from passing through the valve 2.

The valve body 4 has a chamber 12, preferably an elongated chamber, which has a volume "X" of a preselected magnitude. It is also preferred that the elongated chamber 12 has a maximum length axis 14 oriented substantially parallel with a pathway of travel of the valve body 4 during movement of the valve body 4 from the first to the second position.

A material 16 has a volume "Y" and is positioned within the valve body chamber 12. The volume "Y" of the material 16 is less than the volume "X" of the valve body chamber 12 and the material is free to move within the chamber 12 in response to deceleration of the valve body.

The material 16 can be a liquid or a solid. The solid material is preferably particulate material and more preferably metal particles. The material 16, if liquid, can be water, oil, or silicone, for example, preferably oil. The material 16, if solid, can be particles of steel, aluminum, brass, or lead, for example, preferably lead.

One preferred and useful application of this invention is in poppet valves of a fuel system of a diesel engine. In such application, it is preferred that the valve body, which has first and second opposed ends 18, 20, is adapted to withstand, without damage, pressures in excess of 51,000 psi subjected on the valve body second end 20 when the first end 18 of the valve body is in contact with the valve seat 6 and the valve is closed. A poppet valve of a diesel engine fuel system is a most useful application for the apparatus of this invention.

INDUSTRIAL APPLICABILITY

In valves used in fuel systems, particularly valves used in diesel engines, it is advantageous to quickly open and close the valve at relatively high rates of speed and provide a valve that will positively close the valve and the resultant passage of fuel to the engine. If the valve does not effect positive closure, the engine will operate less efficiently than desired.

When the valve body 4 of this invention reaches its second position in contact with the valve seat 6, the valve body is decelerated which causes the material 16 within the valve body chamber 12 to continue to move through the valve body chamber in a direction toward the valve seat.

Forcible contact of the first end 18 of the valve body 4 with the valve seat 6 generate forces tending to cause the valve body 4 to bounce off the seat 6 and be urged away from the seat 6. However the inertia of the material 16 within the decelerating valve body chamber 12 are subjected onto the valve body 4 in a direction counteracting the forces caused by the valve body 4 contacting the seat 6 and thereby reducing the time of absolute closure of the valve 2.

Other aspects, objects and advantages of this invention can be obtained from a study of the drawings, the disclosure and the appended claims.

What is claimed is:

1. In an internal combustion engine fuel system valve having a metal valve seat and a metal body, said valve body being moveable at relatively high rates of speed between a first open position at which the valve body is spaced from the valve seat and a second closed position at which the valve body is contacting the valve seat, the improvement comprising:

said internal combustion engine valve body having a chamber, said chamber having a volume "X" of preselected magnitude; and a material having a volume "Y" less than the volume "X" of the valve body chamber, said internal combustion engine material being positioned within the valve body chamber and moveable within the chamber in response to deceleration of the valve body.

2. A fuel system valve, as set forth in claim 1, wherein the material in the valve chamber is a liquid.

3. A fuel system valve, as set forth in claim 1, wherein the material within the valve chamber is metal particles.

4. A fuel system valve, as set forth in claim 1, wherein the valve body chamber is of elongate configuration with a maximum length axis of the chamber being oriented substantially parallel with a pathway of travel of the valve body during movement of the valve body from the first to the second position.

5. A fuel system valve, as set forth in claim 1 wherein the fuel system valve is a poppet valve.

6. A fuel system valve, as set forth in claim 1, wherein the valve body has a first end adjacent the valve seat and a second opposed end and being of a construction adapted to withstand pressures in excess of 51,000 psi subjected on said valve body.

* * * * *